Patented Apr. 28, 1925.

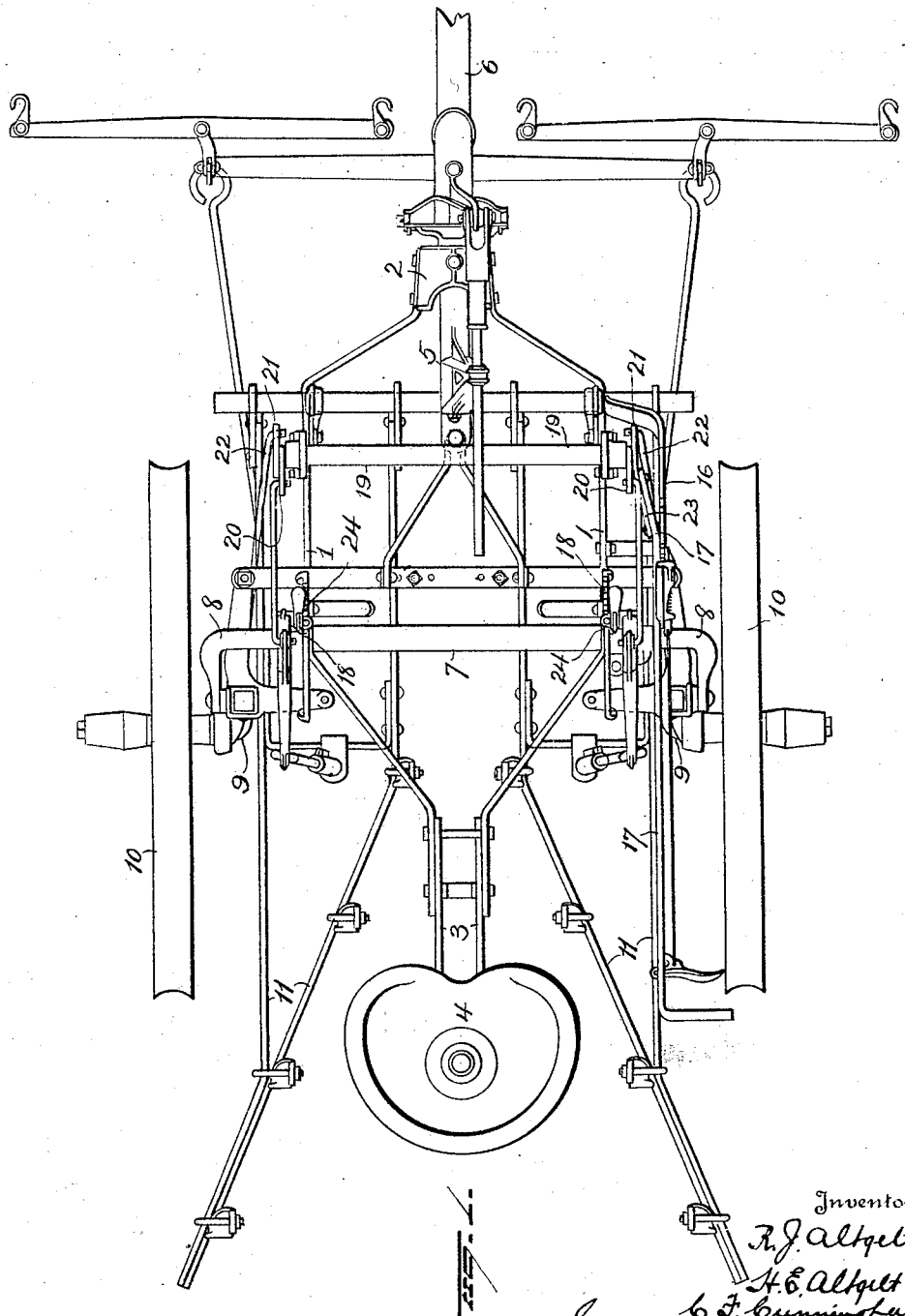

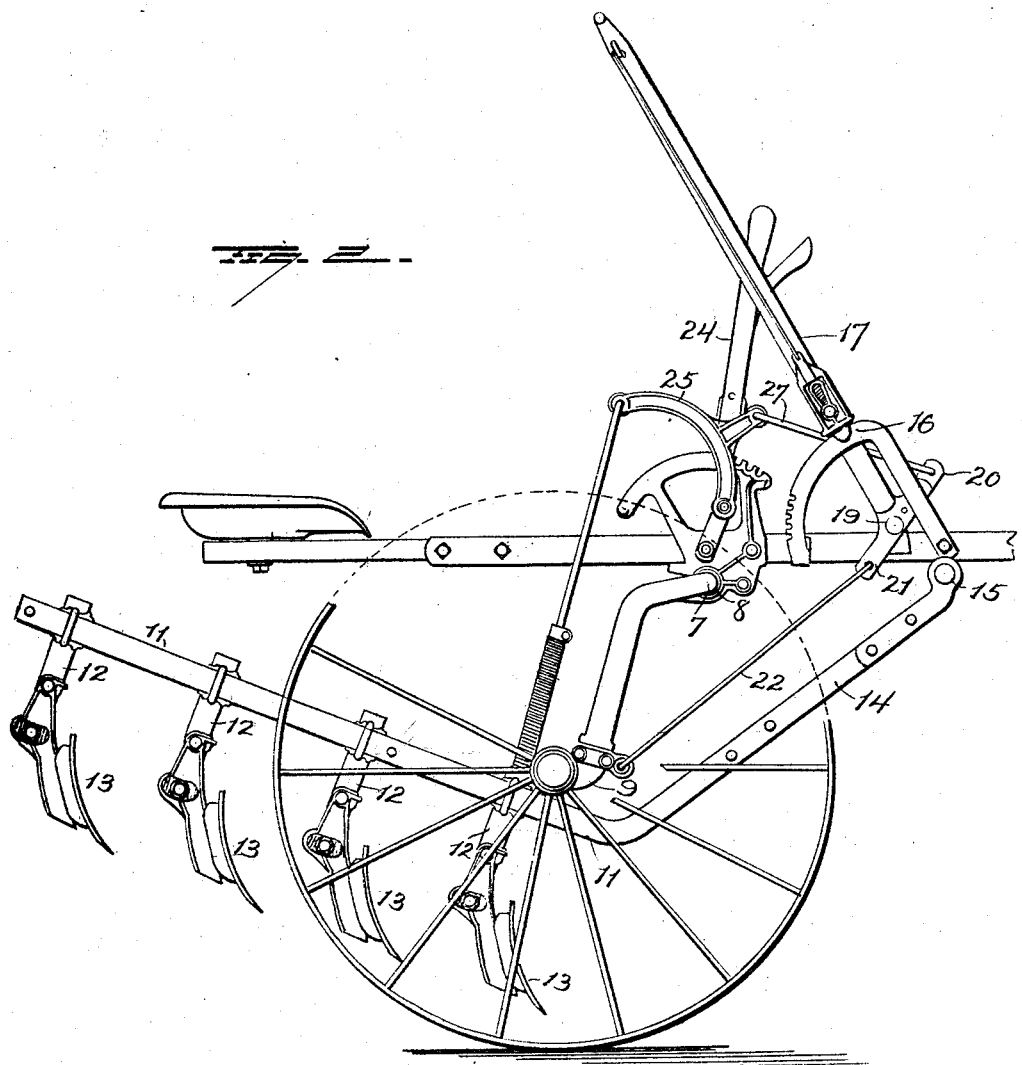

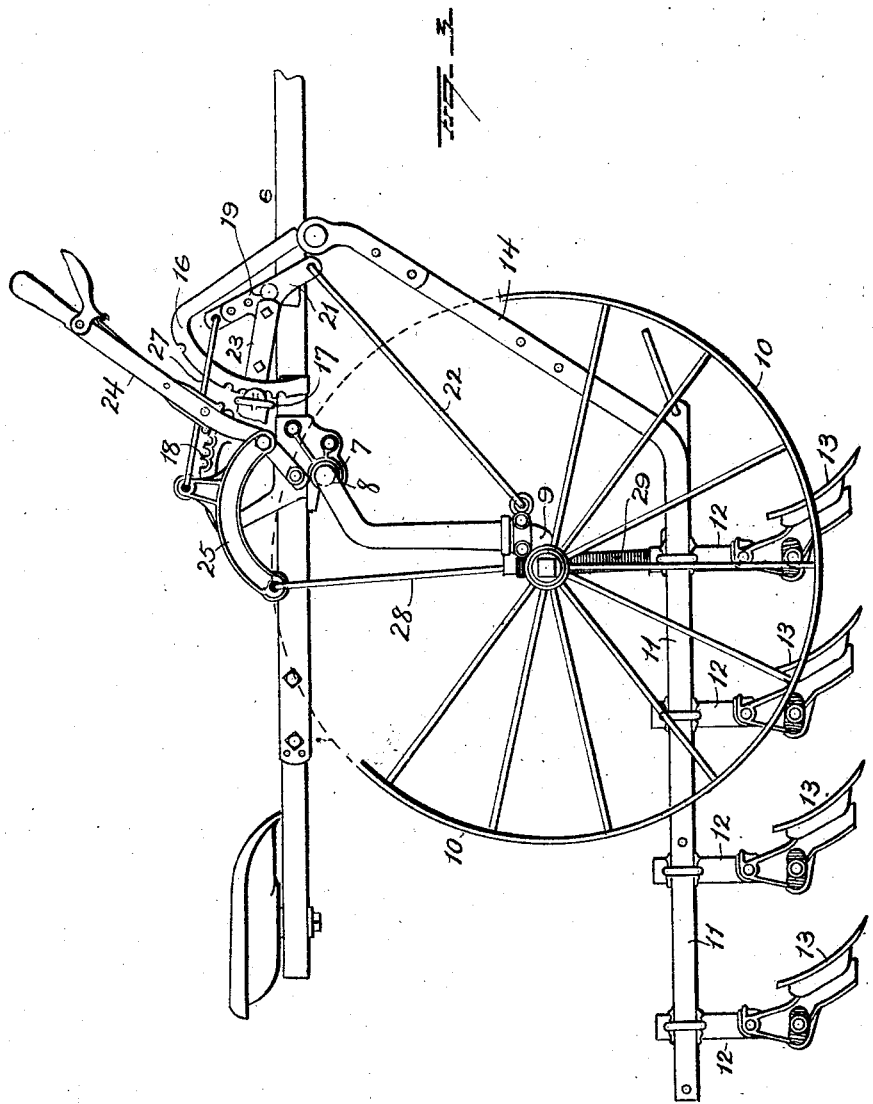

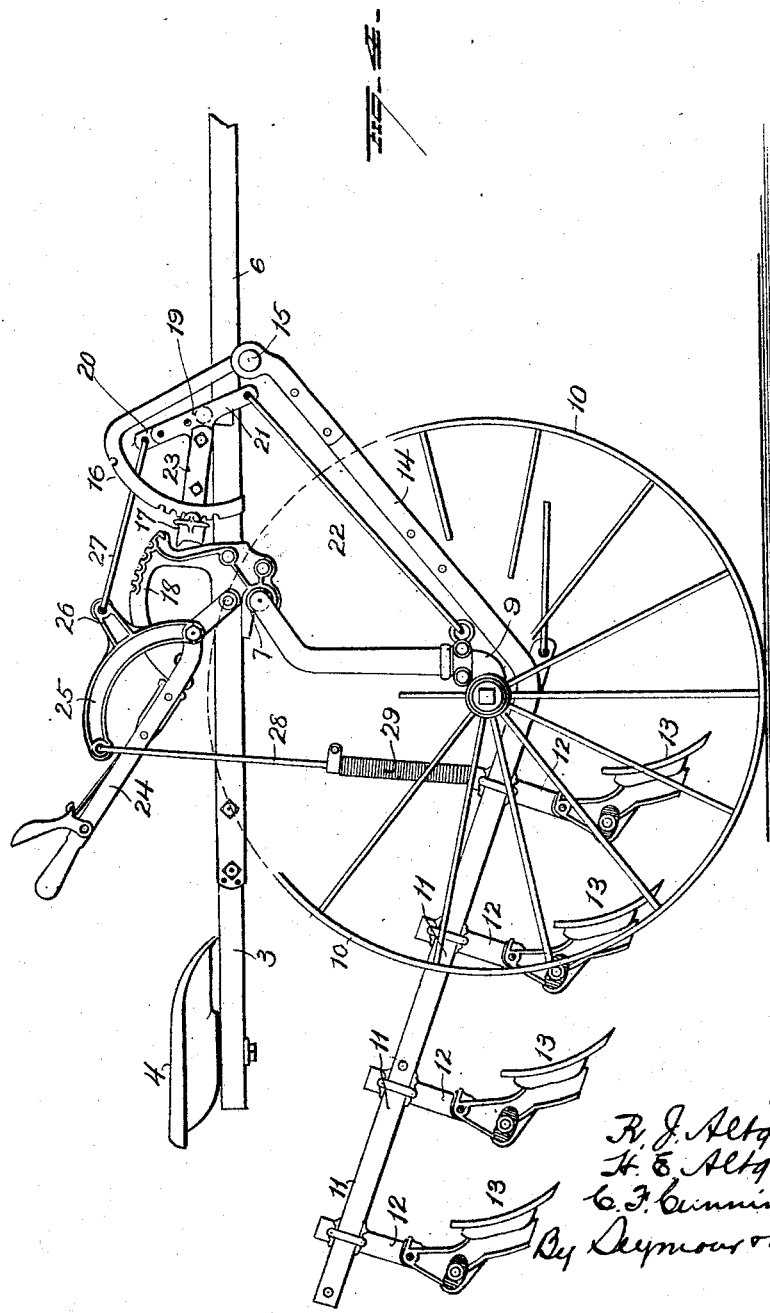

1,535,889

UNITED STATES PATENT OFFICE.

RUDOLPH J. ALTGELT, HERMAN E. ALTGELT, AND CHARLES F. CUNNINGHAM, OF SOUTH BEND, INDIANA, ASSIGNORS TO OLIVER CHILLED PLOW WORKS, OF SOUTH BEND, INDIANA.

WHEELED CULTIVATOR.

Application filed August 8, 1922. Serial No. 580,453.

*To all whom it may concern:*

Be it known that we, RUDOLPH J. ALTGELT, HERMAN E. ALTGELT, and CHARLES F. CUNNINGHAM, citizens of the United States, and residents of South Bend, in the county of St. Joseph and State of Indiana, have invented certain new and useful Improvements in Wheeled Cultivators; and we do hereby declare the following to be a full, clear, and exact description of the invention, such as will enable others skilled in the art to which it appertains to make and use the same.

This invention relates to improvements in wheeled cultivators and more particularly to that type which employs a plurality of gangs,—the present invention having reference especially to lever mechanism for raising and lowering the gang frames.

One object of our present invention is to provide simple and efficient mechanism including a main hand lever and secondary levers, whereby the operator, by manipulation of the main lever may raise both cultivator gangs simultaneously and at the same time cause the carrying wheels to move backwardly in order to place weight upon the cultivator pole and balance the machine when the shovels are out of the ground,— the mechanism being such that either of the secondary hand levers may be readily and conveniently operated independently of each other to raise one cultivator gang while the other remains in operative position relatively to the ground.

A further object is to so construct a cultivator of the pivot-axle type, that the cultivator gang frames may be easily raised and lowered and the carrying wheels moved backwardly or forwardly by the operation of a single hand lever conveniently located and so connected with the gang frames and axle that it may be operated to perform the functions stated with the expenditure of a minimum effort on the part of the operator.

A further object is to so construct and arrange lever mechanism for raising or lowering a plurality of gang frames of a wheeled cultivator, when such lever mechanism includes a main lever for raising the gang frames simultaneously and secondary levers for raising either of said gang frames separately, that said secondary levers shall remain stationary when the main lever is operated and thus avoid the moving of said secondary levers to positions out of convenient reach of the operator when the main lever is operated.

With these and other objects in view, the invention consists in certain novel features of construction and combinations of parts as hereinafter set forth and pointed out in the claims.

In the accompanying drawings, Figure 1 is a plan view of a cultivator embodying our improvements. Figure 2 is a side elevation illustrating the positions of the parts when the gangs have been raised above the ground by operation of the main lever. Figure 3 is a view in side elevation showing the positions of the parts when the main lever is in lowered position and the gangs are in operative position, and Figure 4 is a side view showing the positions of the parts when the main lever is in lowered position and a cultivator gang frame has been raised by a secondary lever.

The main frame of the cultivator is represented at 1 and its forward portion is contracted in width and secured to a centrally located hollow casting 2 while the rear ends of the side bars of said frame extend toward each other and receive supporting bars 3 for a seat 4. The hollow casting 2 affords a mounting for a tongue or pole member 5 but the details of construction of said pole member and its connection with the cultivator structure and with a main pole 6 do not constitute parts of our present invention, but are covered in co-pending applications Serial Nos. 580,451 and 580,452. A further detailed description of said parts herein is therefore unnecessary.

Supported by an intermediate portion of the frame 1 and disposed transversely of the latter is a tubular bar 7 which provides a mounting for a main axle 8 and to the cranks of the latter, pivot axles 9 are connected for the accommodation of carrying wheels 10.

In the embodiment of the invention shown in the drawings, two gang frames 11—11 are employed and carry standards 12 for the cultivator shovels 13,—the forward portions of said gang frames being provided with upwardly and forwardly extending members 14 which are mounted at their upper forward ends on a shaft 15 which is mounted at the forward portion of the frame 1 and projects at its respective ends beyond respective sides of said frame.

A toothed segment 16 for a main lifting lever 17 is rigidly secured to the main frame at one side of the latter and to said main frame, toothed segments 18—18 are rigidly secured at respective sides thereof. A shaft 19 is mounted in suitable bearings secured to the respective side bars of the frame and this shaft is provided at its respective ends with upwardly projecting arms or cranks 20. Arms 21 are secured to the arms 20 and depend below the plane of the shaft 19 and to said arms 21, the forward ends of rods 22 are connected, said rods extending downwardly and rearwardly and are connected with the pivot axles. The arm 21 at one side of the cultivator may be provided with a rearward extension 23 to which the main lever 17 is bolted.

To the lower portion of the frame of each secondary segment 18, a secondary lever 24 is pivotally attached. To each secondary lever at a point somewhat above the pivotal connection of the latter, a curved arm or lever 25 is pivoted and provided at a point intermediate of its ends with a projection 26 which is connected by means of a rod 27 with the arm or crank 20 at one end of the shaft 19. A rod 28 is pivotally connected with the rear end portion of each curved arm or lever 25 and each of said rods 28 is connected, through the medium of a spring 29 with one of the gang frames 11.

With the construction and arrangement of lever mechanisms above described, raising of the main lever 17 from an approximately horizontal position to the position shown in Figure 2 will cause the shaft 19 to be turned and motion to be imparted through the rods 22 to the axles to move the latter in a manner to shift the wheels 10 rearwardly so that weight will be put on the pole and the machine balanced when the cultivator gangs are moved to raised position, which raising movement of the cultivator gangs is effected simultaneously with rearward shifting of the carrying wheels, as follows: The turning of the shaft 19 by operation of the main lever 17 will cause the arms or cranks 20 to move forwardly and transmit motion through the rods 27 to the curved arms 25, causing the latter to rise on their pivotal connections with the secondary levers and, through the medium of the rods 28 and springs 29 to raise both cultivator gangs simultaneously to the position shown in Figure 2 with the cultivator shovels above the ground.

When the cultivator gangs are in operative positions with the shovels in the ground, as indicated in Figure 3, and the main lever locked in approximately horizontal position to the toothed segment 16, rearward shifting of one of the secondary levers from the position shown in Figure 3 to the position shown in Figure 4 will cause one of the cultivator gangs to be elevated to the position shown in Figure 4. It is evident that when one of the secondary levers is moved rearwardly as above described, the pivotal support of the curved arm or lever 25 on said secondary lever will also move rearwardly (in the arc of a circle) and as said curved arm or lever is connected through the rod 27 with the arm 20 of shaft 19 (which latter is locked by the locking of the main lever), said arm or lever 25 will be compelled to move upwardly on its pivotal connection with the secondary lever and thus impart, through the rod 28 and spring 29, motion to raise the cultivator gang.

The rigid securing of the secondary segments 18 to the frame constitutes an important feature of our invention because such construction will permit the two secondary levers to remain stationary while the main lever is being operated and thus avoid the inconvenience of prior constructions in which the secondary toothed segments are hinged and the lifting rods connected with said secondary levers directly and the secondary levers are shifted to positions not within convenient reach of the operator. Our improvements avoid such shifting of the secondary levers when the main lever is operated.

Having fully described our invention what we claim as new and desire to secure by Letters-Patent, is:

1. In a cultivator, the combination with a wheeled frame and a plurality of cultivator gang frames, of a main lifting lever, secondary lifting levers, lifting connections between each secondary lifting lever and one of the gang frames, said lifting connections including a member pivoted to each secondary lever, connections between the main lifting lever and the said lifting connections, means for locking the main lifting lever, and locking segments for the secondary lifting levers, said locking segments fixedly secured to the wheeled frame.

2. In a cultivator, the combination with a frame, crank axle members, carrying wheels and a plurality of gang frames, of a main lifting lever, secondary lifting levers, connections between each secondary lifting lever and one of the gang frames, said lifting connections including a member pivoted to each secondary lever, connections between the main lifting lever and the said lifting connections, connections between the main lifting lever and the crank axle members, locking means for the main lifting lever, and locking segments for the secondary lifting levers fixedly secured to the cultivator frame.

3. The combination with a main frame, crank axle members, carrying wheels, and a plurality of gang frames, of a main lifting lever, connections between the main lifting lever and crank axle members, two secondary levers, arms pivoted to said secondary levers and connected with the gang frames, means connecting said pivoted arms with a part fixed to the main lever, means for locking said main lever, and means for locking each secondary lever.

4. In a cultivator, the combination with a main frame, crank axle members, carrying wheels and a plurality of gang frames, of a shaft mounted on the main frame and provided at its ends with arms, a main lifting lever secured to said shaft, means for locking said lever, two secondary segments fixedly secured to the main frame, a secondary lever pivoted to each segment and having locking means cooperable with the latter, an arm pivoted at one end to each secondary lever, connections between the other end of each pivoted arm and one of the cultivator gangs, a connection between each of said pivoted arms and one of the arms of said shaft, and connections between said shaft and crank-axle members.

5. The combination with a wheeled cultivator frame and cultivator gangs connected therewith, of a transverse shaft mounted on said frame and provided at its ends with arms, a main lifting lever secured to said shaft, two secondary toothed segments fixedly secured to the cultivator frame, secondary lifting levers pivoted to said secondary segments and cooperable therewith, curved arms, each pivoted at one end to one of the secondary lifting levers above the pivotal mounting of the latter, connections between the other ends of said curved arms and the respective cultivator gangs, and rods connected at one end with the arms on said shaft and at their other ends with said curved arms intermediate of the ends of the latter.

In testimony whereof, we have signed this specification in the presence of two subscribing witnesses.

RUDOLPH J. ALTGELT.
HERMAN E. ALTGELT.
CHARLES F. CUNNINGHAM.

Witnesses:
JENNIE M. DAVIS,
HELEN GOSS.